United States Patent
Nakada

(10) Patent No.: US 9,405,998 B2
(45) Date of Patent: Aug. 2, 2016

(54) DISPLAY CONTROL APPARATUS, IMAGE FORMING APPARATUS, AND NON-TRANSITORY COMPUTER READABLE MEDIUM FOR DISPLAYING AN IMAGE PORTION NEAREST A POINTED BLANK PORTION

(71) Applicant: FUJI XEROX CO., LTD., Minato-ku, Tokyo (JP)

(72) Inventor: Misaki Nakada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/452,789

(22) Filed: Aug. 6, 2014

(65) Prior Publication Data

US 2015/0242711 A1  Aug. 27, 2015

(30) Foreign Application Priority Data

Feb. 26, 2014 (JP) ................................ 2014-036059

(51) Int. Cl.
*H04N 1/00* (2006.01)
*G06K 15/00* (2006.01)
*G03G 15/00* (2006.01)

(52) U.S. Cl.
CPC ............ *G06K 15/002* (2013.01); *G03G 15/502* (2013.01); *H04N 1/00* (2013.01)

(58) Field of Classification Search
None
See application file for complete search history.

(56) References Cited

U.S. PATENT DOCUMENTS

| | | | | |
|---|---|---|---|---|
| 5,699,453 | A * | 12/1997 | Ozaki | ........................... 382/176 |
| 2005/0195221 | A1* | 9/2005 | Berger et al. | ................. 345/660 |
| 2007/0236477 | A1* | 10/2007 | Ryu | .................... G06F 3/03547 345/173 |
| 2009/0204915 | A1* | 8/2009 | Yamagami et al. | ........... 715/764 |
| 2009/0315848 | A1* | 12/2009 | Ku | ......................... G06F 3/0416 345/173 |
| 2010/0056220 | A1* | 3/2010 | Oh et al. | ........................ 455/566 |
| 2010/0321406 | A1* | 12/2010 | Iwase et al. | .................... 345/638 |
| 2011/0106615 | A1* | 5/2011 | Churchill et al. | .......... 705/14.49 |
| 2014/0059461 | A1* | 2/2014 | Kim | ............................... 715/769 |

FOREIGN PATENT DOCUMENTS

| | | |
|---|---|---|
| JP | 2003-233368 A | 8/2003 |
| JP | 2011-118943 A | 6/2011 |
| JP | 2012-252723 A | 12/2012 |

* cited by examiner

*Primary Examiner* — Ming Hon
(74) *Attorney, Agent, or Firm* — Sughrue Mion, PLLC

(57) ABSTRACT

A display control apparatus includes an image display that displays a document image representing a document file; an accepting unit that accepts an operation to point a portion in the document image displayed in the image display; an extracting unit that, upon acceptance of the operation to point the portion in the document image by the accepting unit, extracts each image portion surrounded by pixels other than white pixels from the entire document image if a ratio of the white pixels in the pixels in the document image is higher than or equal to a predetermined threshold value in an area of a predetermined size centered at the pointed portion; and a display controller that performs control so as to display information concerning the image portion having the shortest distance from the portion, among the image portions extracted by the extracting unit, in the image display.

9 Claims, 16 Drawing Sheets

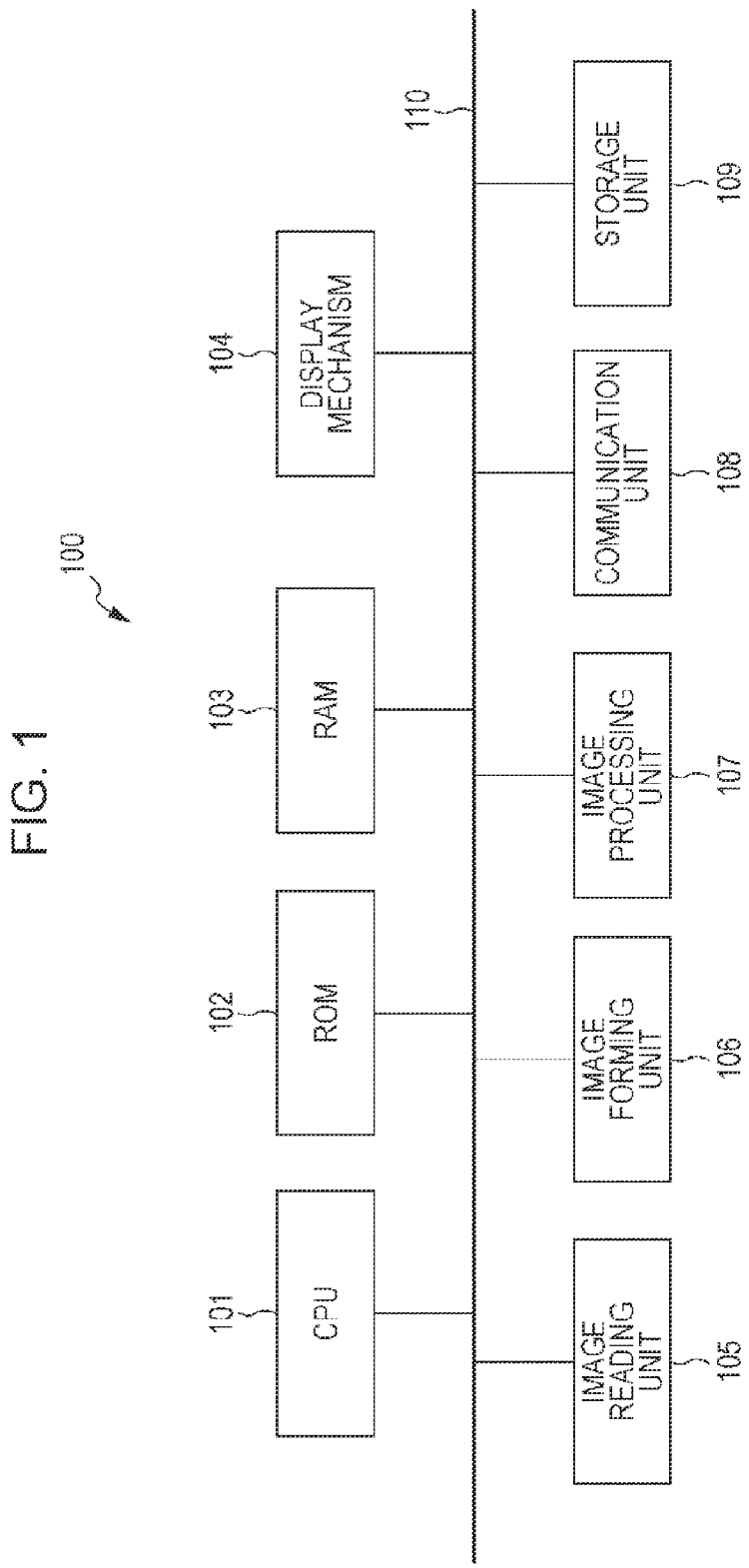

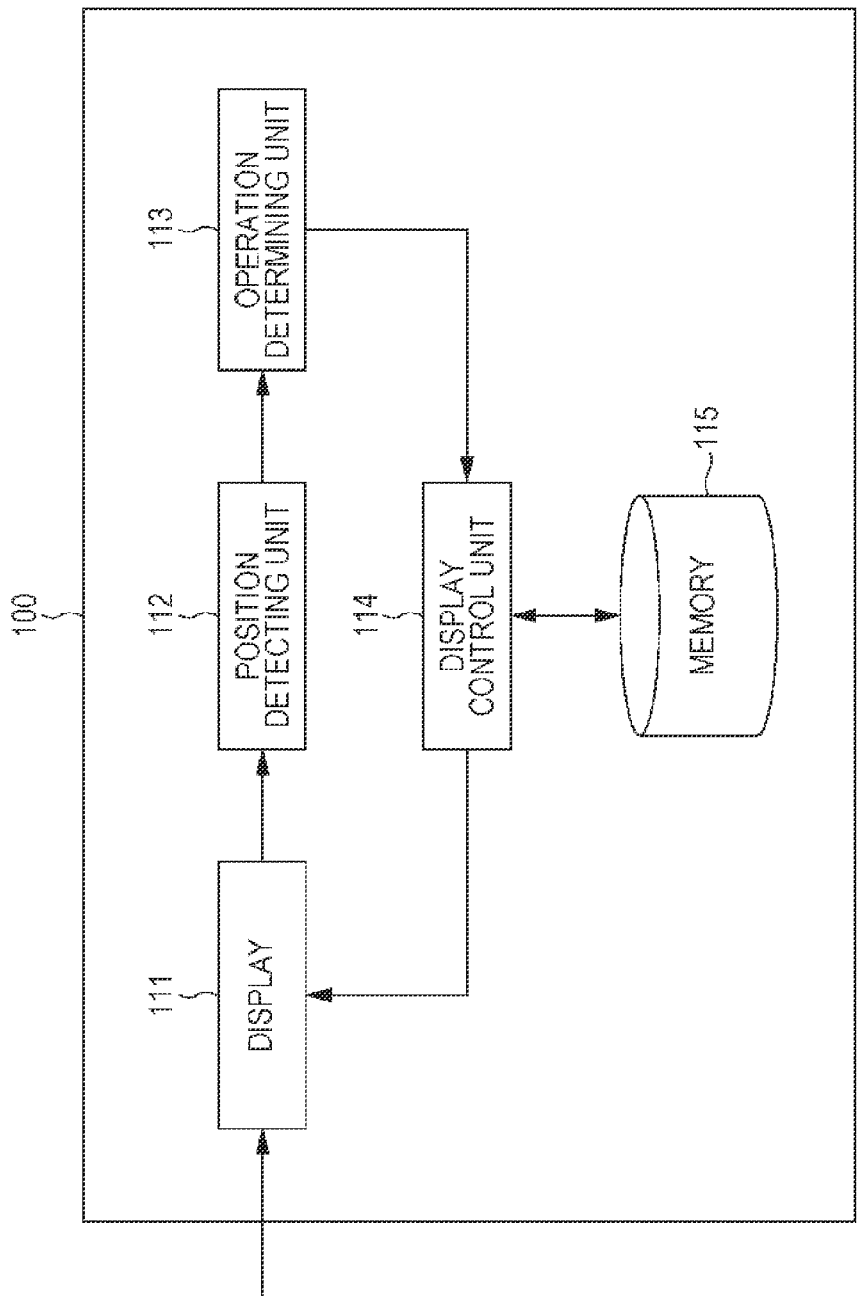

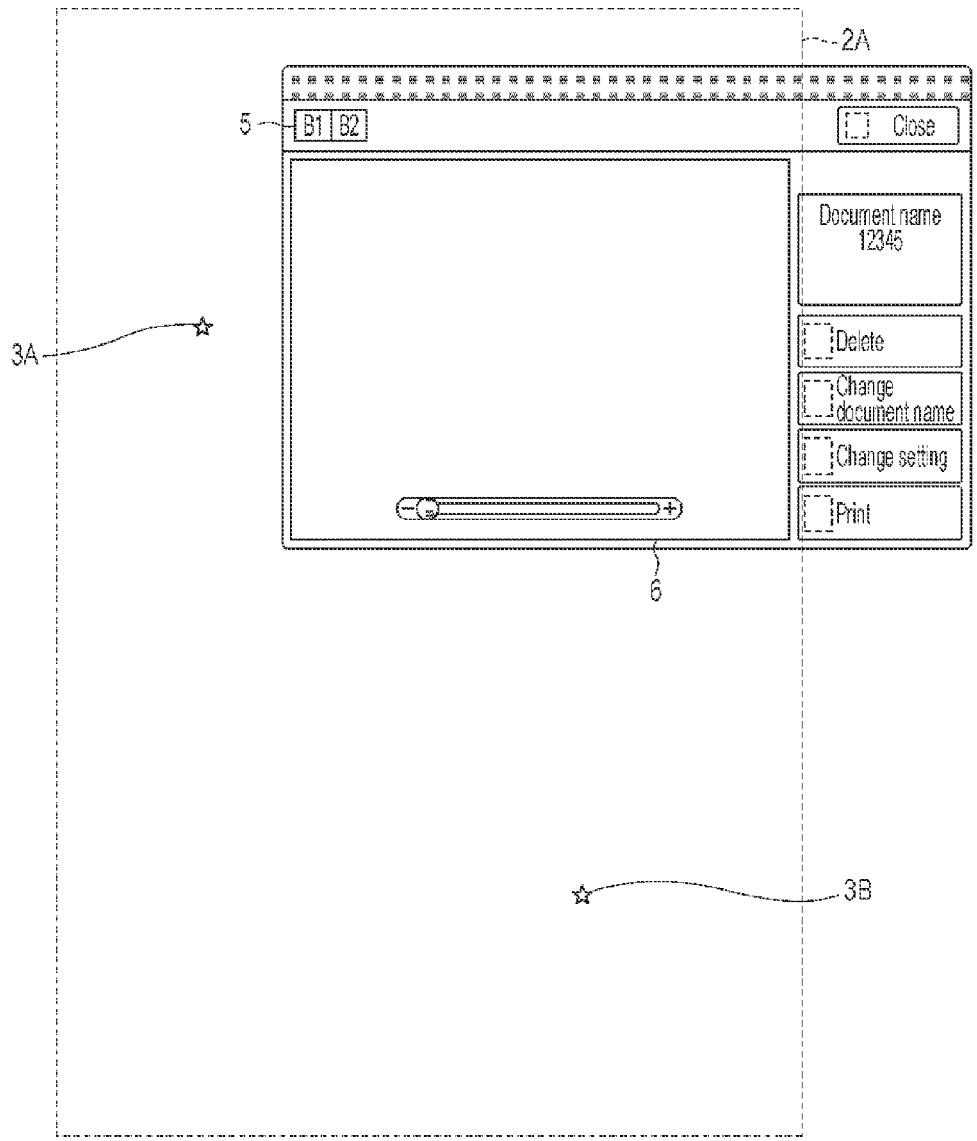

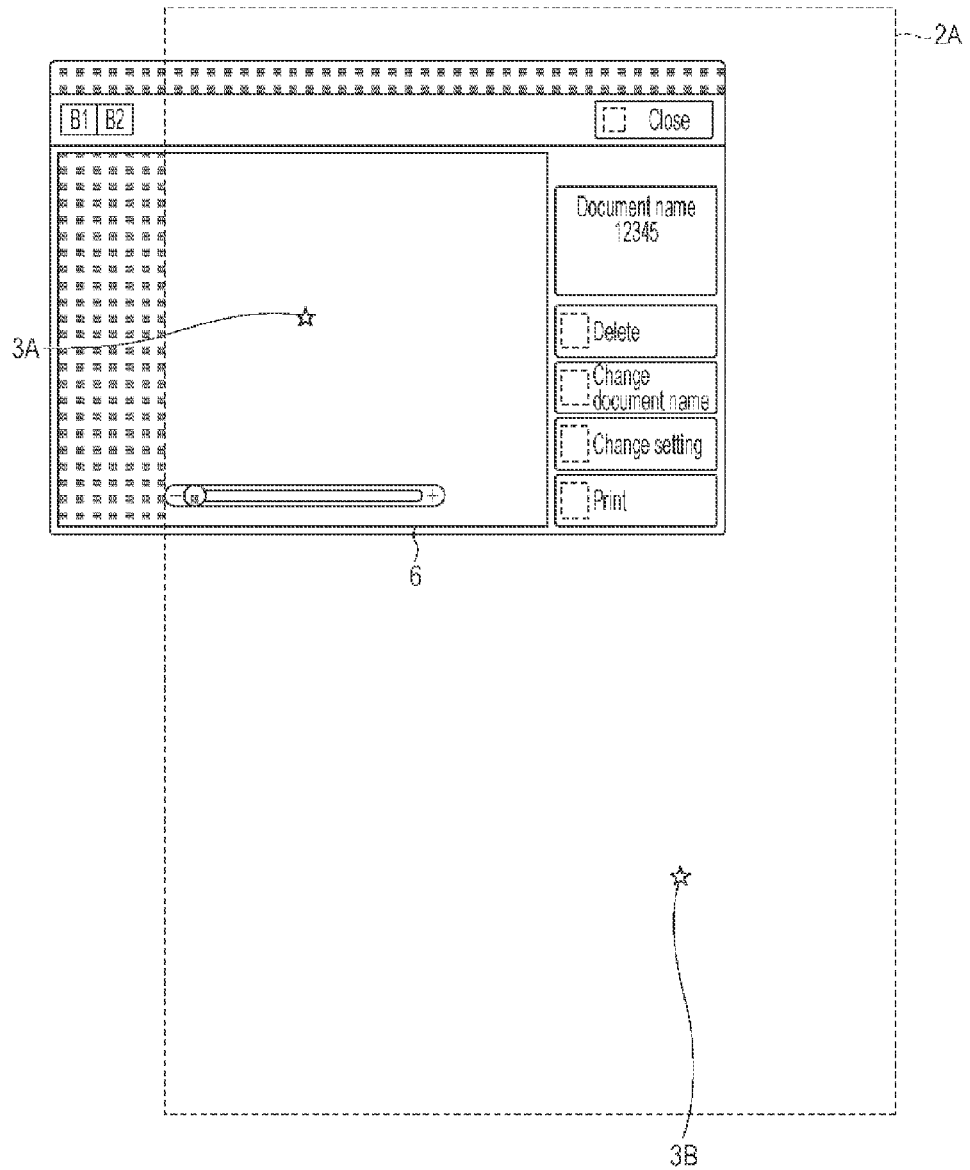

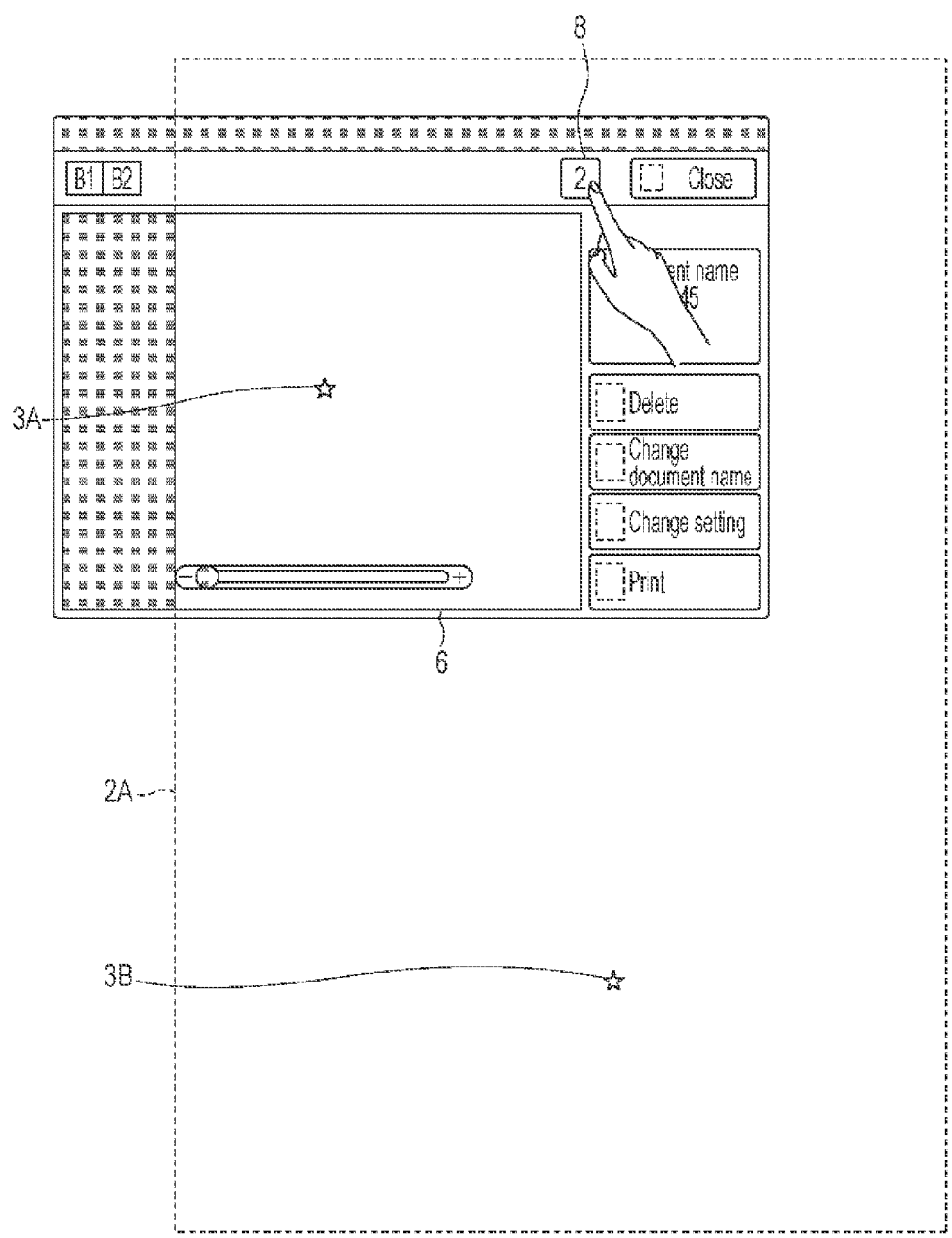

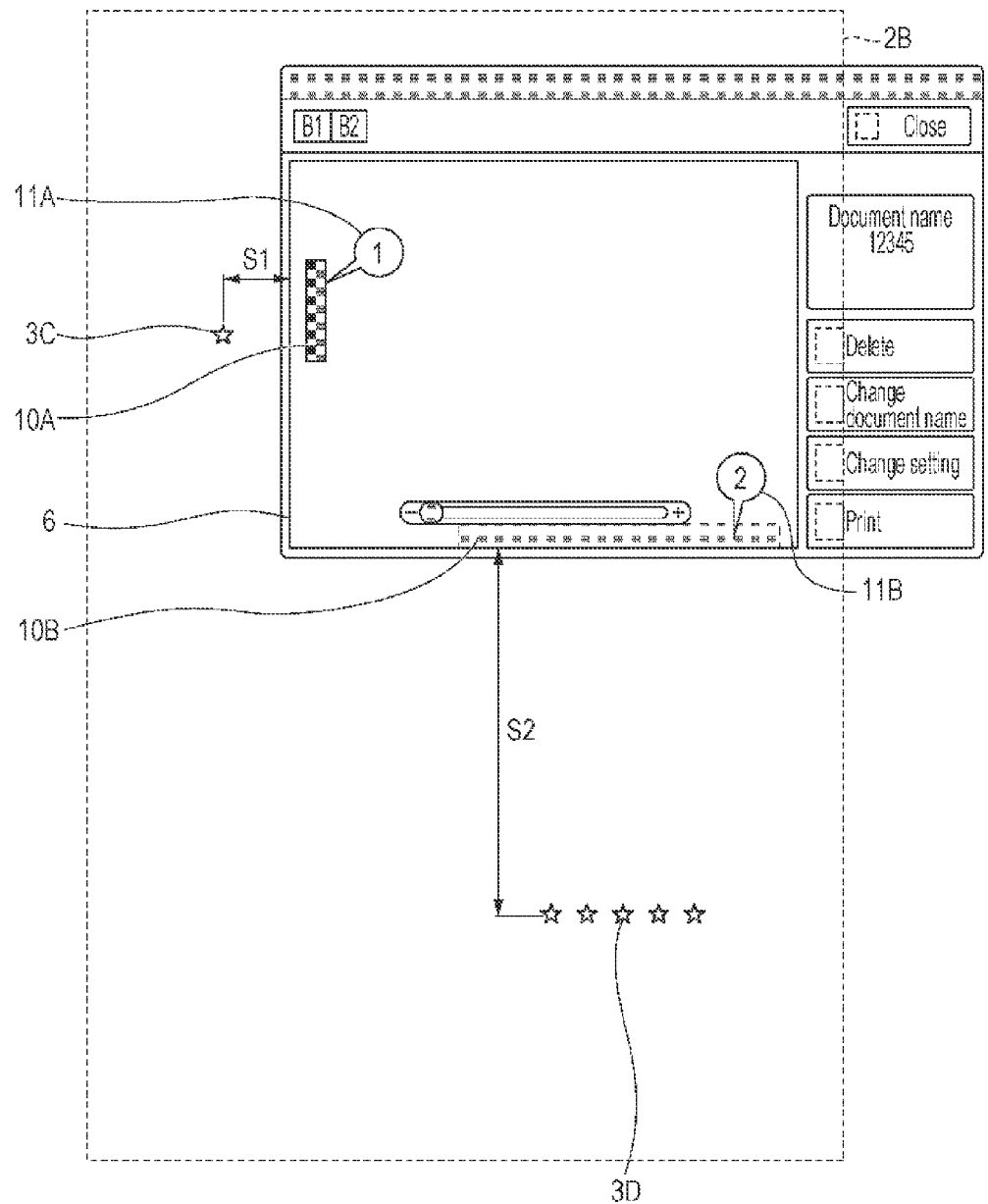

DISPLAY CONTROL APPARATUS, IMAGE FORMING APPARATUS, AND NON-TRANSITORY COMPUTER READABLE MEDIUM FOR DISPLAYING AN IMAGE PORTION NEAREST A POINTED BLANK PORTION

CROSS-REFERENCE TO RELATED APPLICATIONS

This application is based on and claims priority under 35 USC 119 from Japanese Patent Application No. 2014-036059 filed Feb. 26, 2014.

BACKGROUND

Technical Field

The present invention relates to a display control apparatus, an image forming apparatus, and a non-transitory computer readable medium.

SUMMARY

According to an aspect of the invention, there is provided a display control apparatus including an image display, an accepting unit, an extracting unit, and a display controller. The image display displays a document image representing a document file. The accepting unit accepts an operation to point a portion in the document image displayed in the image display. Upon acceptance of the operation to point the portion in the document image by the accepting unit, the extracting unit extracts each image portion surrounded by pixels other than white pixels from the entire document image if a ratio of the white pixels in the pixels in the document image is higher than or equal to a predetermined threshold value in an area of a predetermined size centered at the pointed portion. The display controller performs control so as to display information concerning the image portion having the shortest distance from the portion, among the image portions extracted by the extracting unit, in the image display.

BRIEF DESCRIPTION OF THE DRAWINGS

Exemplary embodiments of the present invention will be described in detail based on the following figures, wherein:

FIG. 1 is a block diagram illustrating an exemplary hardware configuration of an image processing apparatus according to a first exemplary embodiment;

FIG. 2 is a block diagram illustrating an exemplary functional configuration of the image processing apparatus according to the first exemplary embodiment;

FIG. 3A and FIG. 3B illustrate examples of a standard view and an enlarged view, respectively, displayed in a display;

FIG. 6A and 6B are diagrams for description of exemplary screens displayed when the enlargement operation has been performed in the first exemplary embodiment;

FIG. 7A and FIG. 7B are diagrams for description of other exemplary screens displayed when the enlargement operation has been performed;

FIG. 11A and FIG. 11B are diagrams for description of exemplary screens displayed when the enlargement operation has been performed in the third exemplary embodiment.

DETAILED DESCRIPTION

Figure 3A:
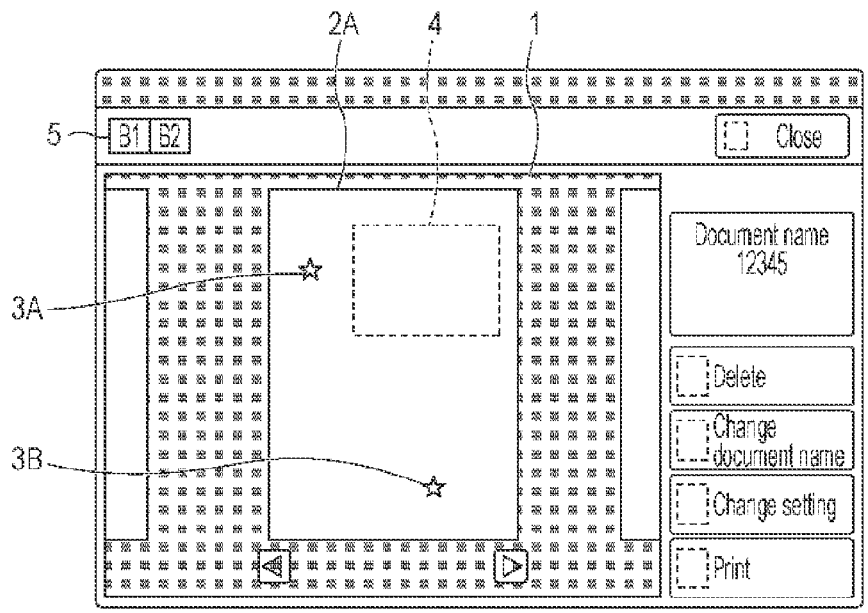

Exemplary embodiments of the present invention will herein be described in detail with reference to the attached drawings.

First Exemplary Embodiment
<Hardware Configuration of Image Processing Apparatus>

FIG. 1 is a block diagram illustrating an exemplary hardware configuration of an image processing apparatus 100 according to a first exemplary embodiment of the present invention. The image processing apparatus 100 according to the first exemplary embodiment has, for example, a scan function, a print function, and a copy function. The image processing apparatus 100 includes a central processing unit (CPU) 101, a read only memory (ROM) 102, a random access memory (RAM) 103, a display mechanism 104, an image reading unit 105, an image forming unit 106, an image processing unit 107, a communication unit 108, and a storage unit 109. The above functional blocks are connected to a bus 110 to exchange data with each other via the bus 110. In the first exemplary embodiment, the image processing apparatus 100 is used as an example of a display control apparatus and an image forming apparatus.

The CPU 101 executes an operating system (OS) and a variety of software, such as applications. The ROM 102 stores a control program executed by the CPU 101. The CPU 101 reads out the control program stored in the ROM 102 to execute the control program using the RAM 103 as a working area. Upon execution of the control program by the CPU 101, the functions of the functional blocks in the image processing apparatus 100 are realized. For example, predetermined display is made in the display mechanism 104 and/or a document set in the image reading unit 105 is read out.

The program executed by the CPU 101 may be provided in a state in which the program is stored in a computer-readable recording medium, such as a magnetic recording medium (for example, a magnetic tape or a magnetic disk), an optical recording medium (for example, an optical disc), a magneto-optical recording medium, or a semiconductor memory. Alternatively, the program may be downloaded to the image processing apparatus 100 using a communication device, such as the Internet.

The display mechanism 104 is composed of, for example, a liquid crystal touch panel display (hereinafter referred to as a touch panel) and displays, for example, data concerning the image processing apparatus 100. The display mechanism 104 detects contact with a displayed screen by a user to accept the operation by the user. Any unit to detect the contact may be used. For example, a unit to detect pressure caused by the contact or a unit to detect static electricity of an object with which contact is made may be used.

The display mechanism 104 displays a standard view and an enlarged view, which are preview screens indicating the state of a document file after printing. The standard view is a display mode in which the images of pages (the image of one page is hereinafter referred to as a document image) indicating the state of the document file after printing are arranged in a row for display. The enlarged view is a display mode in which the document image of a specified page is enlarged for display. The standard view is capable of being switched to the enlarged view in response to an operation by the user.

The image reading unit 105 includes an image scanner (a scanner device) that reads out a document to generate image data representing an image of the document that is read out. The image reading unit 105 supplies the generated image data to the image processing unit 107.

The image forming unit 106, which is an example of an image forming unit, includes an image forming mechanism that forms a toner image corresponding to the image data on a sheet of paper, which is an example of a recording material, with an electrophotographic method or the like to perform a printing process.

The image processing unit 107 performs image processing, such as color correction and/or tone correction, to the supplied image. The image processing unit 107 generates the image data subjected to the image processing to supply the image data to the image forming unit 106.

The communication unit 108 is connected to a communication line (not illustrated) to function as a communication interface that communicates with another apparatus connected to the communication line.

The storage unit 109 has a storage area, such as a hard disk device, and stores data received by the communication unit 108, data generated by the image processing apparatus 100, and so on.

<Functional Configuration of Image Processing Apparatus>

The functional configuration of the image processing apparatus 100 according to the first exemplary embodiment will now be described. FIG. 2 is a block diagram illustrating an exemplary functional configuration of the image processing apparatus 100 according to the first exemplary embodiment.

Referring to FIG. 2, the image processing apparatus 100 includes a display 111 that displays various screens, a position detecting unit 112 that detects a contact operation by the user, an operation determining unit 113 that determines the kind of the contact operation by the user, a display control unit 114 that generates a control signal to control display in the display 111, and a memory 115 that stores data used in the display control by the display control unit 114.

The display 111, which is an example of an image display, is the touch panel in the display mechanism 104. The display 111 displays the various screens including the standard view and the enlarged view under the control of the display control unit 114.

The position detecting unit 112, which is an example of an accepting unit, detects the contact operation by the user on the screen displayed in the display 111 and indicates information about the position where the contact operation has been performed to the operation determining unit 113. When the contact by the user is continuously performed, the position detecting unit 112 indicates the position where the contact operation has been performed to the operation determining unit 113, for example, at predetermined intervals while the contact is continued. Although the operation by the user who touches the screen with his/her finger is described as the contact operation in the following description, the contact operation may be an operation by the user who touches the screen with a touch pen or the like held by the user, instead of his/her finger.

The operation determining unit 113, which is an example of the accepting unit, determines the kind of the contact operation accepted as the operation by the user on the basis of the information indicated from the position detecting unit 112. The contact operation that is accepted is, for example, "tapping", "double tapping", "flicking", or "dragging." The "tapping" is an operation by the user who touches the screen with his/her finger. The "double tapping" is an operation in which the "tapping" is performed twice at the same position. Each of the "tapping" and the "double tapping" is an operation to point a portion displayed on the screen. In the first exemplary embodiment, in response to the double tapping operation in the document image displayed in the standard view, the standard view is switched to the enlarged view in order to enlarge the document image for display. The contact operation to enlarge the document image for display, such as the double tapping, is hereinafter referred to as an enlargement operation.

The "flicking" is an operation by the user who flicks his/her finger in a state in which the user touches the screen with his/her finger. The "dragging" is an operation by the user who moves his/her finger in the state in which the user touches the screen with his/her finger. Upon determination of the kind of the contact operation that is accepted, the operation determining unit 113 indicates information concerning the determined contact operation to the display control unit 114. The information concerning the contact operation includes the kind of the contact operation and information about the position where the contact operation has been performed.

The display control unit 114, which is an example of an extracting unit and a display controller, generates the control signal for controlling the display in the display 111 to control the display in the display 111. Upon indication of the information concerning the contact operation from the operation determining unit 113, the display control unit 114 controls the display in the display 111 on the basis of the indicated information. For example, when the enlargement operation has been performed by the user in the document image that is displayed with the standard view being displayed in the display 111, the display control unit 114 performs the control so as to switch the display from the standard view to the enlarged view.

In the switching of the display from the standard view to the enlarged view, the display control unit 114 calculates an area of a predetermined size centered at the portion pointed by the operation by the user, that is, the portion where the enlargement operation has been performed (hereinafter referred to as an enlargement operation portion). The display control unit 114 performs a blank determination process to the calculated area to determine whether the calculated area is blank. The blank determination process is a process in which, if the ratio of while pixels to the pixels of the document image in the target area is higher than or equal to a predetermined threshold value, the area is determined to be blank.

The blank determination process is performed to the pixels in original image data in a state in which the image processing, such as reduction in size, is not performed in the image processing apparatus 100, for example, the image data received from another apparatus by the communication unit 108 or the image data generated in the image reading unit 105. The display control unit 114 extracts the white pixels in the target area in the blank determination process. For example, the display control unit 114 compares the pixel value, such as the gradation representing the tone of the color brightness, of each pixel in the area with the predetermined threshold value to extract the pixels the pixel values of which are higher than or equal to the threshold value as the white pixels.

If the display control unit 114 determines that the calculated area is not blank, the display control unit 114 displays the calculated area in a display range of the enlarged view (hereinafter referred to as an enlarged display range) to enlarge the document image. If the display control unit 114 determines that the calculated area is blank, the display control unit 114 extracts image portions surrounded by pixels that are not the white pixels from the entire document image for which the enlargement operation has been performed. Then, the display control unit 114 selects an image portion having the shortest distance from the enlargement operation portion (that is, an image portion closest to the enlargement operation portion), among the extracted image portions. The display control unit 114 calculates the area of the predetermined size centered at the selected image portion and displays the calculated area in the enlarged display range of the enlarged view to enlarge the document image.

The enlargement of the document image for display with the selected image portion being centered by the display control unit 114 enhances the image portion having the shortest distance from the portion pointed by the operation by the user to display the information about the image portion. The area of the predetermined size calculated by the display control unit 114 is calculated so as to have the same size as that of the enlarged display range and the area of the predetermined size is hereinafter referred to as an enlarged area.

The display control unit 114 extracts the image portions with, for example, a labeling process in related art. The labeling process is a process to allocate the same number to connected pixels. In the first exemplary embodiment, the same number is allocated to the connected pixels that are not the white pixels to extract a connected area to which the same number is allocated as the image portion. The display control unit 114 may set a threshold value for the number of connected pixels or the area of the connected area to extract the area having a value higher than or equal to the threshold value as the image portion. Alternatively, the display control unit 114 may collectively extract, for example, the connected areas that are close to each other as the image portion.

The memory 115 stores information about the screen displayed in the display 111 and data used in the display control by the display control unit 114, such as the data concerning the document image.

<Description of Standard View and Enlarged View>

Screens displayed in the display 111 will now be described.

FIG. 3A and FIG. 3B illustrate examples of the standard view and the enlarged view, respectively, displayed in the display 111 (refer to FIG. 2). FIG. 3A illustrates an exemplary standard view. FIG. 3B illustrates an exemplary enlarged view.

As illustrated in FIG. 3A, the document images of pages in a document file are arranged in a row for display in the standard view. The document images are reduced in size so that the document image of at least one page is fitted into the display range in the standard view (hereinafter referred to as a standard display range). In the standard view illustrated in FIG. 3A, a document image 2A is displayed at the center of the view in a standard display range 1 and an image portion 3A and an image portion 3B exist in the document image 2A. For example, in response to the enlargement operation in the document image 2A, the standard view is switched to the enlarged view.

As illustrated in FIG. 3B, the document image is displayed in an enlarged display range 6 in a state in which the document image is enlarged, compared with the document image in the standard view, in the enlarged view. The enlarged view illustrated in FIG. 3B results from enlargement of an area 4 indicated by a broken line in FIG. 3A and the area 4 is displayed in the enlarged display range 6. A switching button 5 to which characters "B1" are added is displayed in the display 111. For example, upon pressing (selection) of the switching button 5 with the tapping operation, the switching from the enlarged view to the standard view is performed. In response to, for example, the flicking operation or the dragging operation in the enlarged display range 6, the enlarged display range 6 is moved with respect to the document image 2A and a different portion in the same page is displayed.

<Processing Procedure When Enlargement Operation Has Been Performed>

Figure 4:
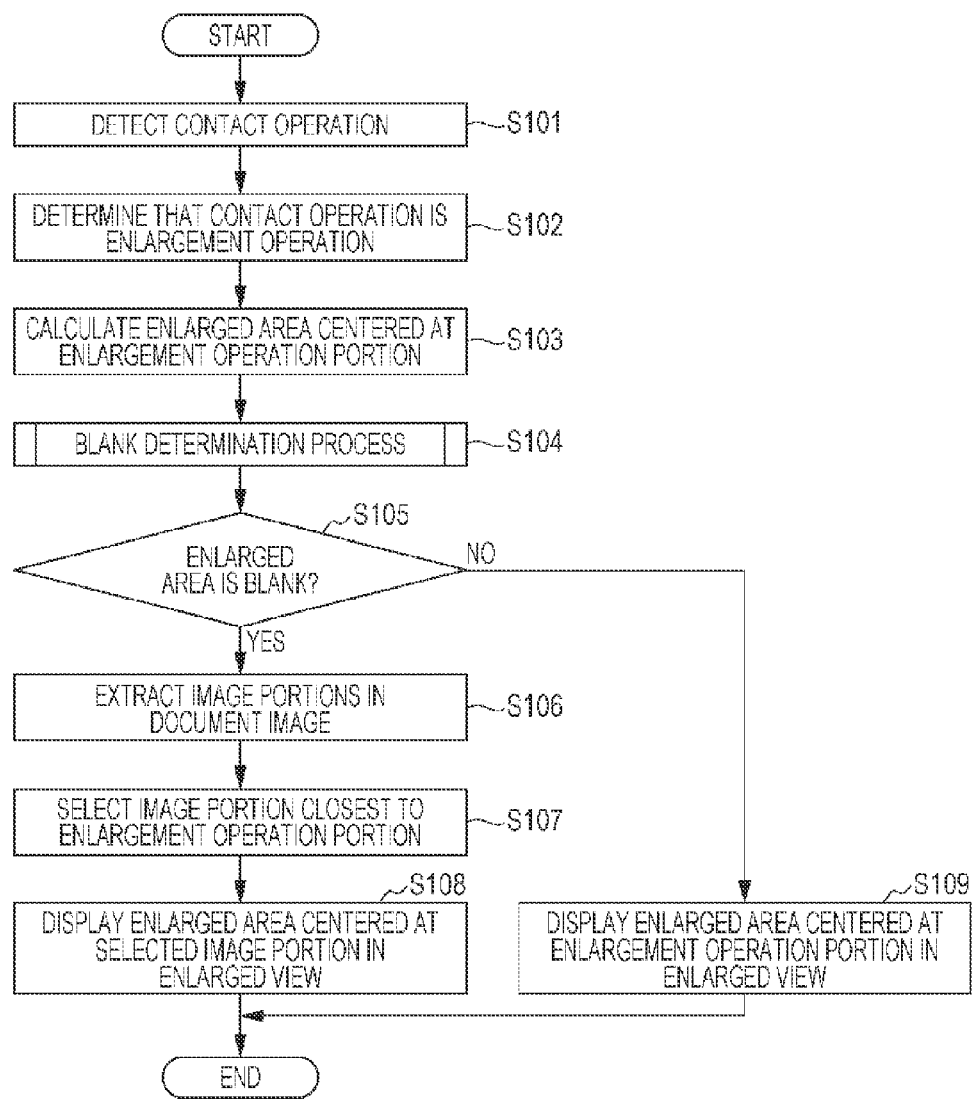
FIG. 4 is a flowchart illustrating an exemplary processing procedure when an enlargement operation has been performed in the first exemplary embodiment.

A processing procedure when the enlargement operation has been performed will now be described. FIG. 4 is a flowchart illustrating an exemplary processing procedure when the enlargement operation has been performed in the first exemplary embodiment.

Referring to FIG. 4, in response to the enlargement operation by the user on the screen displayed in the display 111, in Step S101, the position detecting unit 112 detects the contact operation and indicates information about the position where the contact operation has been performed to the operation determining unit 113. In Step S102, the operation determining unit 113 determines that the contact operation by the user is the enlargement operation on the basis of the information indicated from the position detecting unit 112. The operation determining unit 113 indicates information concerning the enlargement operation, that is, information about the enlargement operation portion or the like to the display control unit 114.

In Step S103, the display control unit 114 calculates the enlarged area centered at the enlargement operation portion in the document image on the basis of the information indicated from the operation determining unit 113. In Step S104, the display control unit 114 performs the blank determination process to the calculated enlarged area. In Step S105, the display control unit 114 determines whether the enlarged area is blank. The blank determination process will be described in detail with reference to FIG. 5.

If the enlarged area is blank (YES in Step S105), in Step S106, the display control unit 114 extracts the image portions existing in the document image for which the enlargement operation has been performed with, for example, the labeling process. In Step S107, the display control unit 114 selects the image portion closest to the enlargement operation portion, among the extracted image portions. In Step S108, the display control unit 114 displays the enlarged area centered at the selected image portion in the enlarged display range 6 of the enlarged view. Then, the processing procedure in FIG. 4 is terminated.

If the enlarged area calculated in Step S103 is not blank (NO in Step S105), in Step S109, the display control unit 114 displays the enlarged area calculated in Step S103, that is, the enlarged area centered at the enlargement operation portion in the enlarged display range 6 of the enlarged view. Then, the processing procedure in FIG. 4 is terminated.

<Description of Blank Determination Process>

Figure 5:
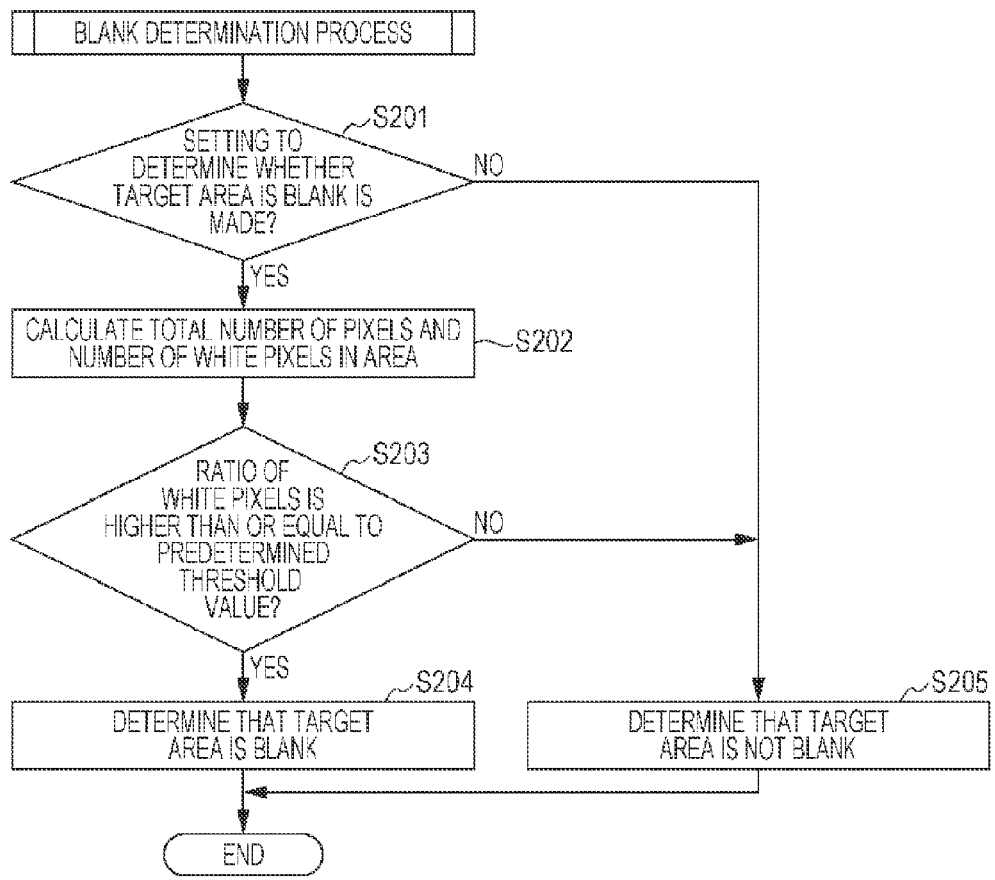
FIG. 5 is a flowchart illustrating an exemplary blank determination process.

The blank determination process will now be described in detail. FIG. 5 is a flowchart illustrating an example of the blank determination process.

Referring to FIG. 5, in Step S201, the display control unit 114 determines whether a setting to determine whether the target area is blank is made. The presence of the setting is capable of being changed by the user. If the setting to determine whether the target area is blank is made (YES in Step S201), in Step S202, the display control unit 114 calculates the total number of pixels and the number of white pixels in the area in the document image for which the blank determination process is to be performed in a state in which the image processing, such as the reduction in size, is not performed.

In Step S203, the display control unit 114 determines whether the ratio of the white pixels to all the pixels is higher than or equal to a predetermined threshold value on the basis of the total number of pixels and the number of white pixels that are calculated. For example, when the predetermined threshold value is 100%, the display control unit 114 determines that the target area is blank if all the pixels are the white pixels. The predetermined threshold value is capable of being changed with, for example, a setting by the user.

If the ratio of the white pixels is higher than or equal to the predetermined threshold value (YES in Step S203), in Step S204, the display control unit 114 determines that the target area is blank. Then, the blank determination process in FIG. 5 is terminated. If the setting to determine whether the target area is blank is not made (NO in Step S201) or if the ratio of the white pixels is lower than the predetermined threshold value (NO in Step S203), in Step S205, the display control unit 114 determines that the target area is not blank. Then, the blank determination process in FIG. 5 is terminated.

<Exemplary Process When Enlargement Operation Has Been Performed>

Figure 6A:
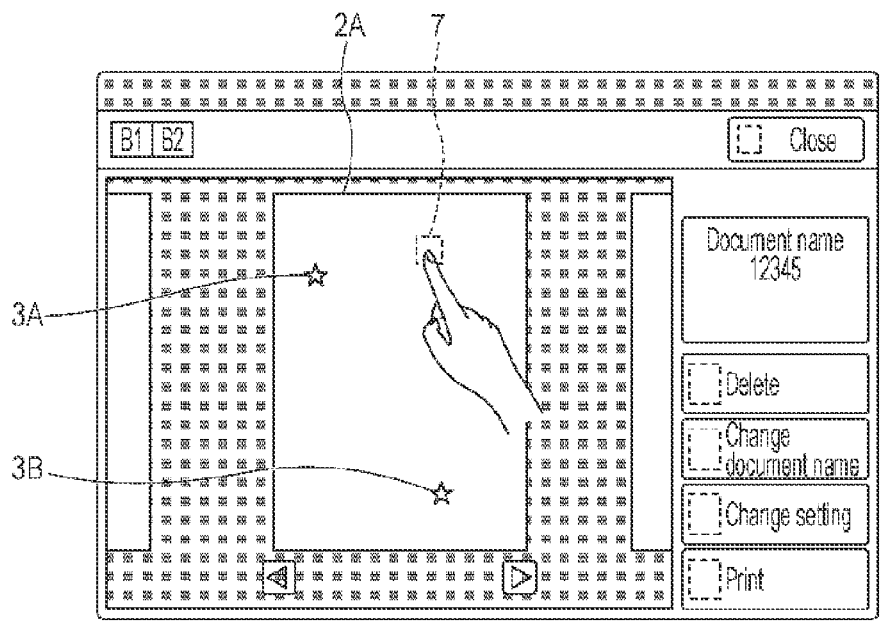

Screens displayed when the enlargement operation has been performed will now be described. FIG. 6A and FIG. 6B are diagrams for description of exemplary screens displayed when the enlargement operation has been performed in the first exemplary embodiment. FIG. 6A illustrates the standard view and the page of the document image 2A is displayed at the center of the standard view. FIG. 6B illustrates the enlarged view switched from the standard view in FIG. 6A. Here, an area 7 indicated by a broken line in FIG. 6A is the enlargement operation portion and the enlarged area centered at the area 7 in FIG. 6A is blank.

In response to the enlargement operation in the area 7 in FIG. 6A, the display control unit 114 extracts the image portion 3A and the image portion 3B in the page of the document image 2A because the enlarged area centered at the area 7 is blank and selects the image portion 3A closest to the area 7, which is the enlargement operation portion. The display control unit 114 (refer to FIG. 2) displays the enlarged area centered at the image portion 3A in the enlarged display range 6, as in the enlarged view illustrated in FIG. 6B. For example, when the enlarged area centered at the area 7 is not fitted into the document image 2A, the display control unit 114 performs the blank determination process to the pixels in the document image 2A in the enlarged area.

<Another Exemplary Process When Enlargement Operation Has Been Performed>

Figure 7B:
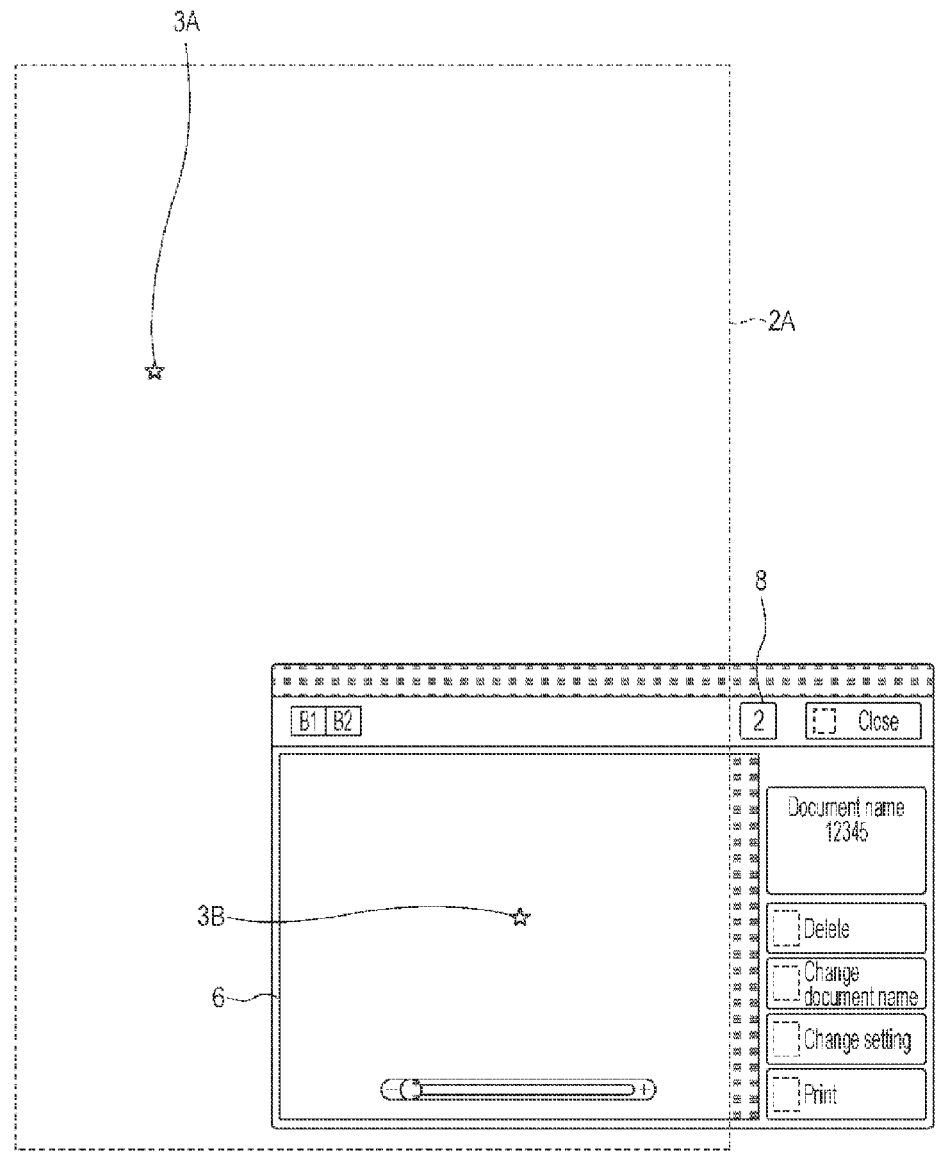

Another exemplary process when the enlargement operation has been performed will now be described. FIG. 7A and FIG. 7B are diagrams for description of other exemplary screens displayed when the enlargement operation has been performed. FIG. 7A and FIG. 7B illustrate the enlarged views. The enlarged view illustrated in FIG. 7A results from the enlargement operation in the area 7 in FIG. 6A.

In response to the enlargement operation in the area 7 in FIG. 6A, the display control unit 114 displays the enlarged area centered at the image portion 3A in the enlarged display range 6, as in the enlarged view illustrated in FIG. 6B, because the enlarged area centered at the area 7 is blank. The display control unit 114 in the first exemplary embodiment takes a count of the image portions extracted as the image portions that exist in the document image for which the enlargement operation has been performed and displays the count in a count display portion 8, as in the enlarged view illustrated in FIG. 7A. In the enlarged view illustrated in FIG. 7A, since the display control unit 114 extracts the image portion 3A and the image portion 3B as the image portions in the document image and the count of the image portions is two, "2" is displayed in the count display portion 8.

In response to an operation to point the portion of the count display portion 8 with the tapping or the like in the enlarged view illustrated in FIG. 7A, the display control unit 114 switches the image portion at the center to the next image portion that is extracted. Specifically, the display control unit 114 moves the enlarged display range 6 with respect to the document image 2A to display the enlarged area centered at the next image portion in the enlarged display range 6. Since the image portion next to the image portion 3A is the image portion 3B, the enlarged area centered at the image portion 3B is displayed, as in the enlarged view illustrated in FIG. 7B.

Even when the flicking or the like has been performed to move the enlarged display range 6 after the display of the enlarged area centered at the image portion 3A, the enlarged area centered at the image portion 3B, which is the next image portion, is displayed upon pressing of the count display portion 8. Although the two image portions are extracted in the examples illustrated in FIG. 7A and FIG. 7B, the image portions are selected in any order, for example, the order specified by the display control unit 114 upon pressing of the count display portion 8 when three or more image portions are extracted. Each time the count display portion 8 is pressed, the image portion displayed at the center is switched to another image portion to display the enlarged area.

As described above, the image processing apparatus 100 according to the first exemplary embodiment determines whether the area centered at the position where the contact operation has been performed is blank in response to the contact operation to enlarge the document image for display and, if the area centered at the position where the contact operation has been performed is blank, enlarges the document image for display with the image portion having the shortest distance to the position where the contact operation has been performed being centered. Accordingly, for example, even when it is difficult for the user to find out where the image portion exists in the page and the user is not capable of determining the area to be enlarged because, for example, the image portion is small or the image portion is light in the preview screen before the enlarged display, the display range is moved to the position where the image portion is drawn in response to an operation by the user for the enlarged display.

In the image processing apparatus 100 according to the first exemplary embodiment, the amount of operation by the user when the information about the image portions existing in the document image is displayed is reduced, for example, compared with a configuration in which the user performs an operation to move the display range to find the portion where the image portion is drawn after the enlarged display.

In addition, since the image portion displayed at the center is switched upon pressing of the count display portion 8 and the display range is moved to the position where the next image portion is drawn, the amount of operation by the user when another image portion in the document image is enlarged for display is reduced.

Second Exemplary Embodiment

A second exemplary embodiment of the present invention will now be described. Although the hardware configuration and the configuration of the functional blocks are the same as those in the first exemplary embodiment in the second exemplary embodiment, the second exemplary embodiment differs from the first exemplary embodiment in the process performed by the display control unit 114 when the enlargement operation has been performed. The display control unit 114 displays the image portion closest to the enlargement operation portion at the center in response to the enlargement operation in the standard view in the first exemplary embodiment. In contrast, in the second exemplary embodiment, the display control unit 114 indicates the positions of the image portions existing in the document image for which the enlargement operation has been performed in response to the enlargement operation in the standard view. The same reference numerals are used in the second exemplary embodiment to identify the same components described in the first exemplary embodiment. A detailed description of such components is omitted herein.

<Processing Procedure When Enlargement Operation Has Been Performed>

Figure 8:
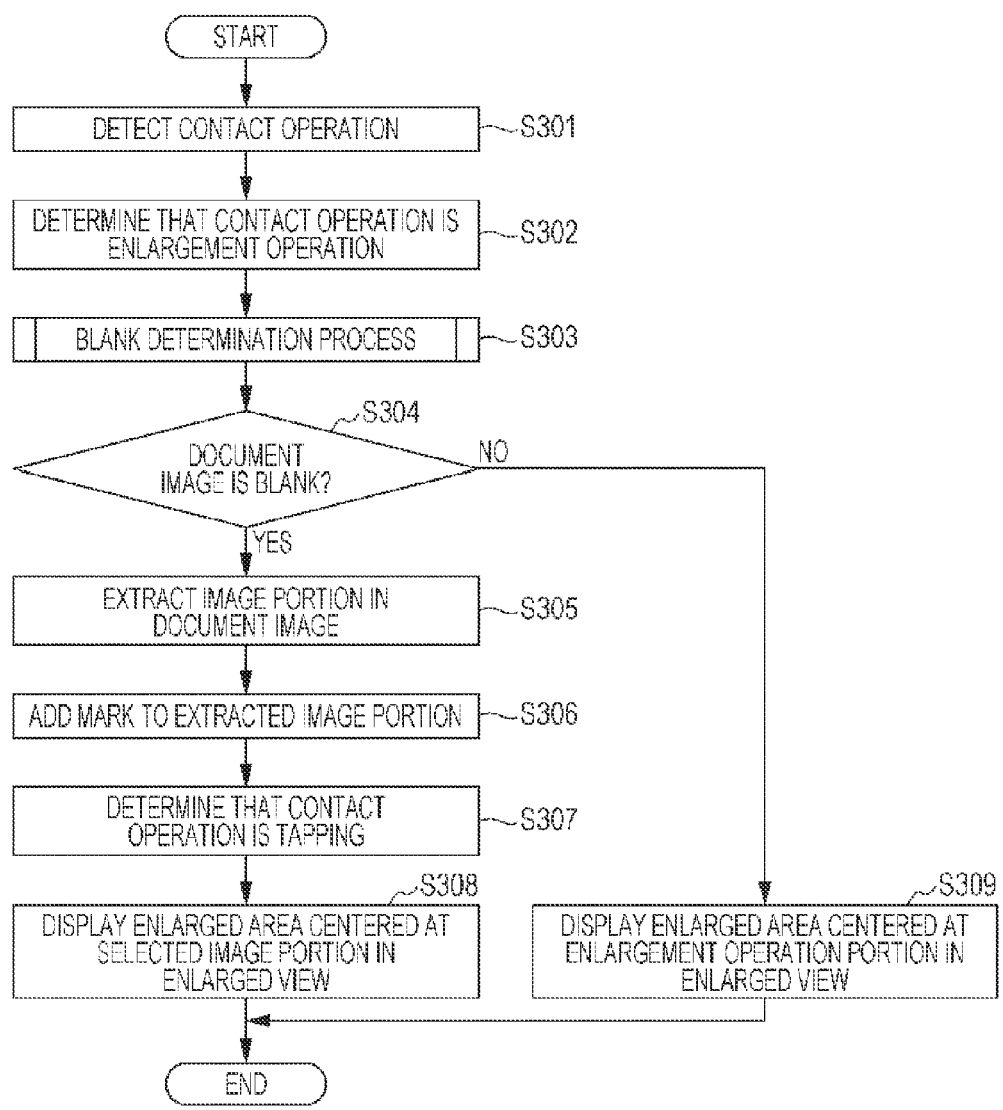
FIG. 8 is a flowchart illustrating an exemplary processing procedure when the enlargement operation has been performed in a second exemplary embodiment.

FIG. 8 is a flowchart illustrating an exemplary processing procedure when the enlargement operation has been performed in the second exemplary embodiment.

Referring to FIG. 8, in response to the enlargement operation by the user on the screen displayed in the display 111, in Step S301, the position detecting unit 112 detects the contact operation and indicates information about the position where the contact operation has been performed to the operation determining unit 113. In Step S302, the operation determining unit 113 determines that the contact operation by the user is the enlargement operation on the basis of the information indicated from the position detecting unit 112. The operation determining unit 113 indicates information concerning the enlargement operation, that is, information about the enlargement operation portion and the like to the display control unit 114.

In Step S303, the display control unit 114 performs the blank determination process to the entire document image for which the enlargement operation has been performed upon indication of the information concerning the enlargement operation from the operation determining unit 113. In Step S304, the display control unit 114 determines whether the document image is blank. If the document image is blank (YES in Step S304), in Step S305, the display control unit 114 extracts each image portion existing in the document image with, for example, the labeling process. In Step S306, the display control unit 114 adds a mark, which is an example of a notification image, to the image portion that is extracted.

The addition of the mark to the image portion closest to the portion pointed by the operation by the user by the display control unit 114 enhances the image portion to display the information about the image portion. The mark added to each image portion is to indicate the position of the image portion in the document image to the user. Any mark indicating the image portion may be used. For example, a circle or a rectangle surrounding the image portion may be used.

In response to an operation to point the mark added to the image portion with the tapping, in Step S307, the position detecting unit 112 detects the contact operation and the operation determining unit 113 determines that the contact operation is the tapping on the basis of the information indicated from the position detecting unit 112. However, the operation to select the mark is not limited to the tapping and any operation may be used.

Upon indication of the information about the contact operation from the operation determining unit 113, in Step S308, the display control unit 114 determines that the image portion to which the pointed mark is added is selected and displays the enlarged area centered at the selected image portion in the enlarged display range 6 of the enlarged view to enlarge the document image. Then, the processing procedure in FIG. 8 is terminated. If the document image is not blank (NO in Step S304), in Step S309, the display control unit 114 displays the enlarged area centered at the position for which the contact operation has been performed in Step S301, that is, the enlarged area centered at the enlargement operation portion in the enlarged display range 6 of the enlarged view. Then, the processing procedure in FIG. 8 is terminated.

The user performs the operation to point the mark added to the image portion in Step S307. However, when the user performs an operation to point a portion other than the portion indicated by the mark, the display control unit 114 displays the enlarged area centered at the pointed portion in the enlarged display range 6 of the enlarged view.

<Exemplary Process When Enlargement Operation Has Been Performed>

Figure 9A:
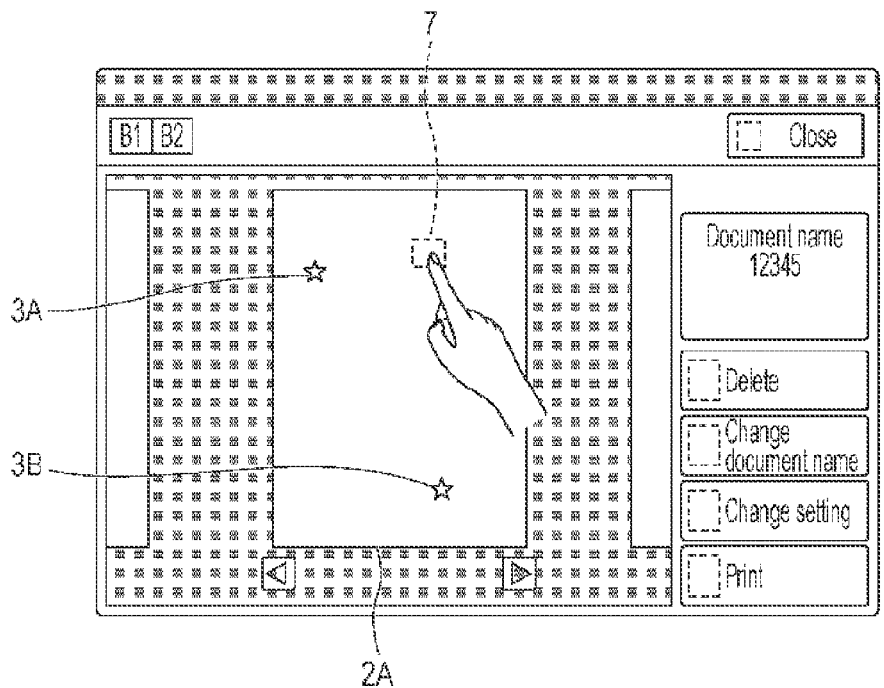
FIG. 9A to FIG. 9C are diagrams for description of exemplary screens displayed when the enlargement operation has been performed in the second exemplary embodiment.
Figure 9B:
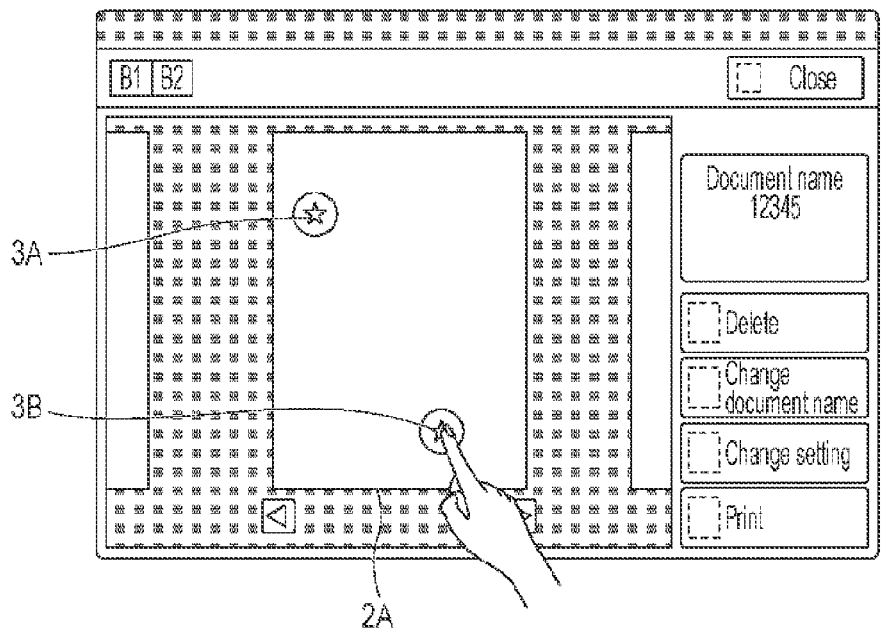
Figure 9C:
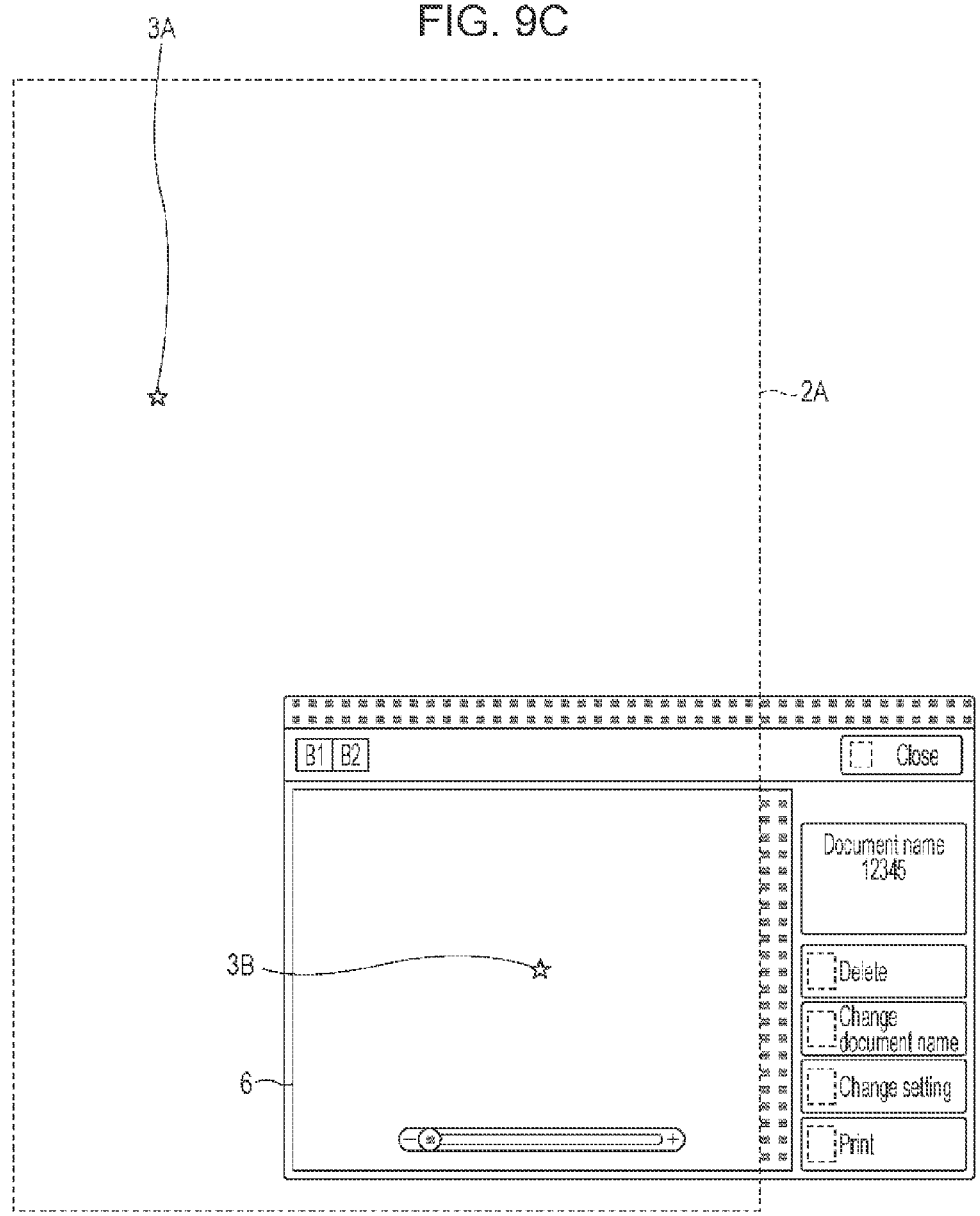

Screens displayed when the enlargement operation has been performed will now be described. FIG. 9A to FIG. 9C are diagrams for description of exemplary screens displayed when the enlargement operation has been performed in the second exemplary embodiment. FIG. 9A and FIG. 9B each illustrate the standard view. The page of the document image 2A is displayed at the center of each standard view. FIG. 9C illustrates the enlarged view switched from the standard view in FIG. 9B. Here, the area 7 indicated by a broken line in FIG. 9A is the enlargement operation portion and the document image 2A in FIG. 9A is blank.

In response to the enlargement operation in the area 7 in FIG. 9A, the display control unit 114 extracts the image portion 3A and the image portion 3B in the document image 2A because the document image 2A for which the enlargement operation has been performed is blank. The display control unit 114 adds marks to the image portion 3A and the image portion 3B that are extracted, as in the standard view illustrated in FIG. 9B. In the standard view illustrated in FIG. 9B, circular marks surrounding the respective image portions are added to the image portion 3A and the image portion 3B.

In the standard view illustrated in FIG. 9B, in response to an operation to point a portion in the area surrounded by the circle by the user with, for example, the tapping, the display control unit 114 displays the enlarged area centered at the image portion surrounded by the pointed circle in the enlarged display range 6. The enlarged view illustrated in FIG. 9C results from pointing of the circle added to the image portion 3B in the standard view in FIG. 9B, and the enlarged area centered at the image portion 3B is displayed in the enlarged view in FIG. 9C. When the user points a portion other than the areas surrounded by the circles added to the image portions with, for example, the tapping in the standard view in FIG. 9B, the display control unit 114 displays the enlarged area centered at the pointed portion in the enlarged display range 6 of the enlarged view.

As described above, the image processing apparatus 100 according to the second exemplary embodiment determines whether the entire document image is blank in response to the operation to enlarge the document image for display and, if the entire document image is blank, adds the mark to the image portion in the document image to indicate the position of the image portion in the document image to the user. Accordingly, the position of the image portion is indicated with the operation by the user, for example, even when it is difficult for the user to find out where the image portion exists in the page and the user is not capable of determining the area to be enlarged.

Although the display control unit 114 adds the circular marks to all the image portions in the second exemplary embodiment, such a configuration is not limitedly used. For example, the display control unit 114 may vary the mark to be added depending on the kind or the position of the extracted image portion. For example, the display control unit 114 may read out characters with an optical character recognition (OCR) process in the related art to add a rectangular mark to each character portion and add a circular mark to each portion other than the character portion. The display control unit 114 may determine multiple characters in an upper portion of the page to be a header to add a header mark to the character portion.

As in the first exemplary embodiment, the display control unit 114 may take a count of the image portions in the document image and may display the count in the count display portion 8, as illustrated in FIG. 7A and FIG. 7B, also in the second exemplary embodiment. Upon pressing of the count display portion 8, the enlarged areas centered at the image portions are sequentially displayed. When the count display portion 8 is pressed in the standard view illustrated in FIG. 9B, for example, the enlarged area centered at the image portion selected by the display control unit 114 in accordance with a predetermined criterion is displayed in the enlarged display range 6.

Although the display control unit 114 performs the blank determination process to the entire document image in the second exemplary embodiment, the display control unit 114 may perform the blank determination process to the enlarged area centered at the enlargement operation portion, as in the first exemplary embodiment. In this case, the display control unit 114 determines whether the enlarged area centered at the enlargement operation portion is blank in Step S303 and Step S304. If the enlarged area is blank, the display control unit 114 extracts each image portion from the entire document image for which the enlargement operation has been performed and adds the mark to the image portion in Step S305 and Step S306.

The predetermined threshold value used in the blank determination process may be varied depending on the area to be subjected to the blank determination process. For example, the predetermined threshold value may be set to 95% when the blank determination process is performed to the entire document image and the predetermined threshold value may be set to 100% when the blank determination process is performed to the enlarged area centered at the enlargement operation portion.

Third Exemplary Embodiment

A third exemplary embodiment of the present invention will now be described. Although the hardware configuration and the configuration of the functional blocks are the same as those in the first exemplary embodiment and the second exemplary embodiment in the third exemplary embodiment, the third exemplary embodiment differs from the first exemplary embodiment and the second exemplary embodiment in the process performed by the display control unit 114 when the enlargement operation has been performed. For example, the display control unit 114 adds the mark to the image portion to indicate the position of the extracted image portion in response to the enlargement operation in the standard view in the second exemplary embodiment. In contrast, in the third exemplary embodiment, the display control unit 114 displays an image to indicate the position of the extracted image portion and the size of the image portion. The same reference numerals are used in the third exemplary embodiment to identify the same components described in the first exemplary embodiment and the second exemplary embodiment. A detailed description of such components is omitted herein.

<Processing Procedure When Enlargement Operation Has Been Performed>

Figure 10:
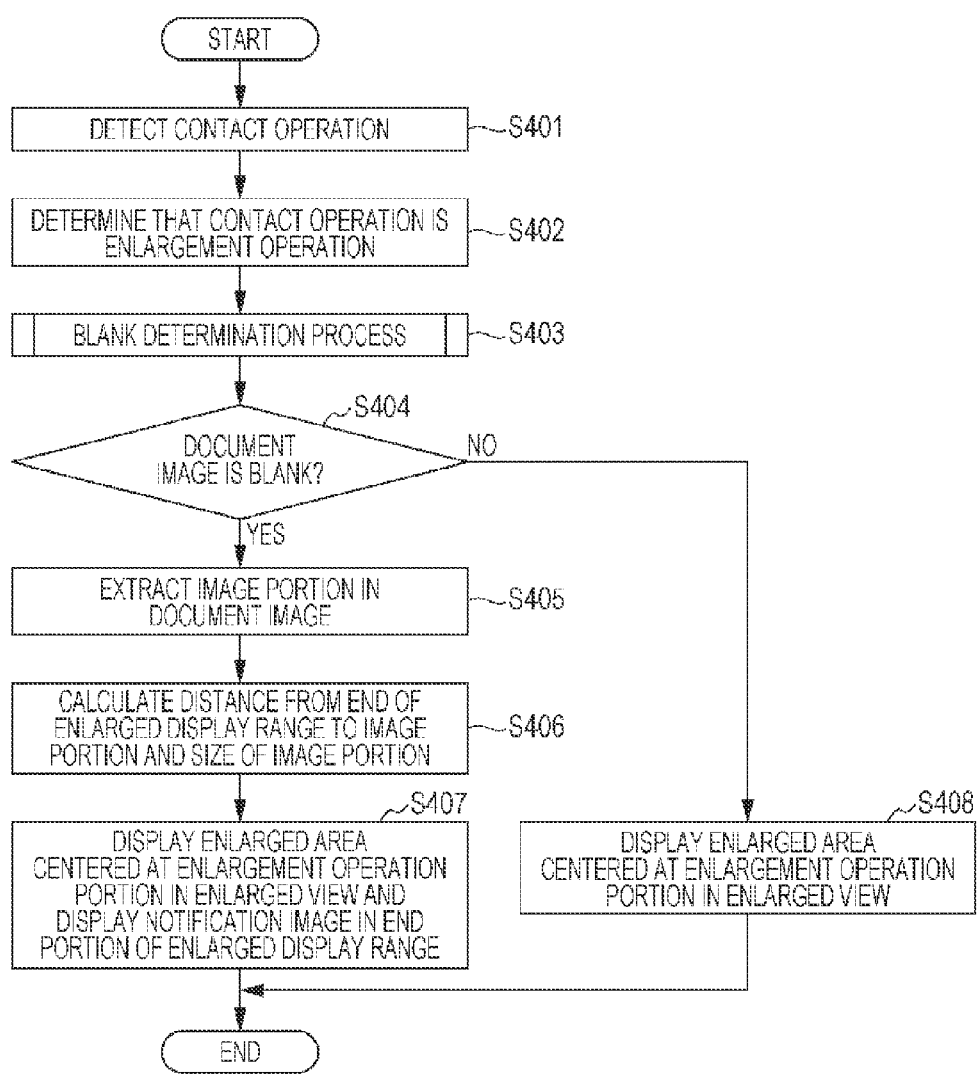
FIG. 10 is a flowchart illustrating an exemplary processing procedure when the enlargement operation has been performed in a third exemplary embodiment.

FIG. 10 is a flowchart illustrating an exemplary processing procedure when the enlargement operation has been performed in the third exemplary embodiment.

Referring to FIG. 10, since Steps S401 to S405 and Step S408 are the same as Steps S301 to S305 and Step S309 in FIG. 8, a description of Steps S401 to S405 and Step S408 is omitted herein. After the display control unit 114 extracts each image portion existing in the document image in Step S405, in Step S406, the display control unit 114 calculates the distance from an end of the enlarged area centered at the enlargement operation portion, that is, the enlarged display range 6 when the standard view is switched to the enlarged view to the image portion and the size of the image portion for each image portion that is extracted. The processing in Step S406 is performed for each image portion outside the enlarged display range.

In Step S407, the display control unit 114 switches the standard view to the enlarged view to display the enlarged area centered at the enlargement operation portion in the enlarged display range 6 and display an image (hereinafter referred to as a notification image) to notify the user of the distance to the image portion and the size of the image portion calculated in Step S406 in an end portion of the enlarged display range 6. The notification image is displayed for each image portion so as to correspond to the image portion.

Specifically, the display control unit 114 varies the gradation of the color of the notification image, the size of the notification image, and so on depending on the distance to the image portion and the size of the image portion to notify the user of the position of the image portion in the document image and the size of the image portion. For example, the display control unit 114 may deepen the color of the notification image with the decreasing distance from the end of the enlarged display range 6 to the image portion or may increase the size of the notification image with the increasing size of the image portion. The display of the notification image corresponding to the image portion closest to the portion pointed by the operation by the user by the display control unit 114 displays the information about the image portion. Then, the processing procedure in FIG. 10 is terminated.

<Exemplary Process When Enlargement Operation Has Been Performed>

Figure 11A:
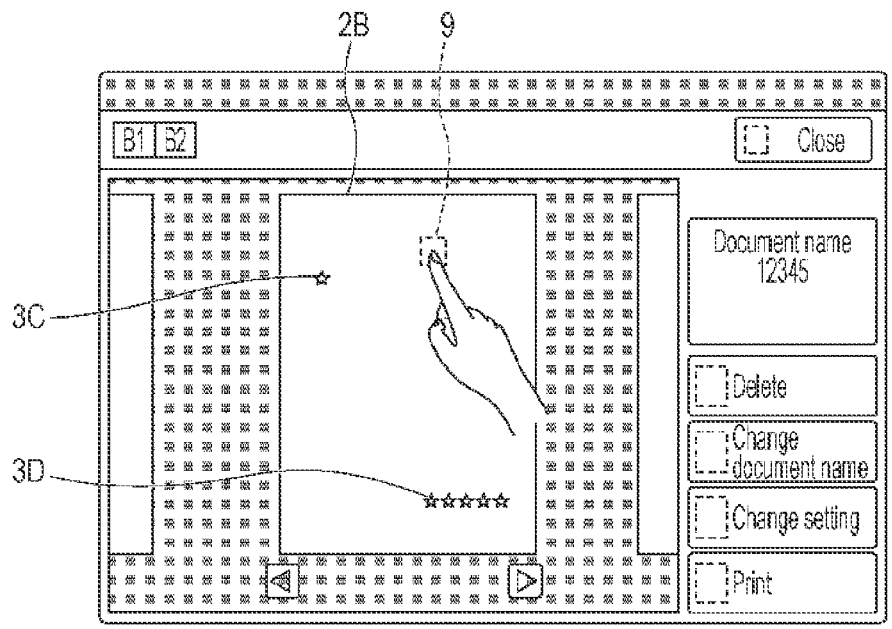

Screens displayed when the enlargement operation has been performed will now be described. FIG. 11A and FIG. 11B are diagrams for description of exemplary screens displayed when the enlargement operation has been performed in the third exemplary embodiment. FIG. 11A illustrates the standard view and the page of a document image 2B is displayed at the center of the standard view. FIG. 11B illustrates the enlarged view switched from the standard view in FIG. 11A. Here, an area 9 indicated by a broken line in FIG. 11A is the enlargement operation portion and the document image 2B in FIG. 11A is blank.

In response to the enlargement operation in the area 9 in FIG. 11A, the display control unit 114 extracts an image portion 3C and an image portion 3D in the document image 2B because the document image 2B for which the enlargement operation has been performed is blank. The display control unit 114 calculates the distance from an end of the enlarged area centered at the enlargement operation portion, that is, the enlarged display range 6 when the standard view is switched to the enlarged view to the image portion and the size of the image portion for each image portion that is extracted.

Then, the display control unit 114 switches the standard view to the enlarged view to display the enlarged area centered at the area 9, which is the enlargement operation portion, in the enlarged display range 6 and display the notification image to notify the user of the distance to the image portion and the size of the image portion, as in the enlarged view illustrated in FIG. 11B. In the enlarged view illustrated in FIG. 11B, a notification image 10A is displayed for the image portion 3C and a notification image 10B is displayed for the image portion 3D.

The notification image 10A is displayed along an end close to the image portion 3C among the ends of the enlarged display range 6, and the notification image 10B is displayed along an end close to the image portion 3D among the ends of the enlarged display range 6. Since the image portion 3D is larger than the image portion 3C, the notification image 10B is displayed in a size larger than that of the notification image 10A. In addition, since a distance S1 from the corresponding end of the enlarged display range 6 to the image portion 3C is shorter than a distance S2 from the corresponding end of the enlarged display range 6 to the image portion 3D, the color of the notification image 10A is displayed in a color deeper than that of the notification image 10B.

Since multiple notification images exist when multiple image portions exist in the document image, a number is allocated to each notification image and the allocated number is also displayed. In the enlarged view illustrated in FIG. 11B, "1" (the number denoted by reference numeral 11A) is allocated to the notification image 10A and reference numeral 11A is displayed adjacent to the corresponding notification image 10A. "2" (the number denoted by reference numeral 11B) is allocated to the notification image 10B and reference numeral 11B is displayed adjacent to the corresponding notification image 10B.

Pressing of, for example, a notification button (not illustrated) in the enlarged view allows the user to switch between display of the notification images and non-display thereof.

As described above, the image processing apparatus 100 according to the third exemplary embodiment determines whether the entire document image is blank in response to the operation to enlarge the document image for display and, if the entire document image is blank, calculates the distance from the end of the display range to the image portion and the size of the image portion. The image processing apparatus 100 displays the notification image to notify the user of the position of the image portion in the document image (for example, the direction of the image portion, the distance to the image portion) and the size of the image portion. Accordingly, the position and the size of the image portion are indicated with the operation by the user, for example, even when it is difficult for the user to find out where the image portion exists in the page and the user is not capable of determining the area to be enlarged.

Although the display control unit 114 displays the enlarged area centered at the enlargement operation portion in the enlarged display range 6 and displays the notification image to notify the user of the distance from the end of the enlarged display range 6 to the image portion in the third exemplary embodiment, such a configuration is not limitedly used. For example, the display control unit 114 may display the enlarged area centered at the image portion closest to the enlargement operation portion in the enlarged display range 6 and may display the notification image to notify the user of the distance from the enlarged display range 6 to the image portion. In addition, also when an operation, such as the flicking, to move the enlarged display range 6 with respect to the document image 2B has been performed, the display control unit 114 may move the enlarged display range 6 and may calculate the distance from the end of the enlarged display range 6 after the movement to the image portion to display the notification image on the basis of the calculated distance.

As in the first exemplary embodiment, the display control unit 114 may take a count of the image portions in the document image and may display the count in the count display portion 8, as illustrated in FIG. 7A and FIG. 7B, also in the third exemplary embodiment. Upon pressing of the count display portion 8, the enlarged areas centered at the image portions are sequentially displayed. When the count display portion 8 is pressed in the state in which the image portion is not at the center of the enlarged view, as in the enlarged view illustrated in FIG. 11B, for example, the enlarged area centered at the image portion selected by the display control unit 114 in accordance with a predetermined criterion is displayed in the enlarged display range 6.

Although the display control unit 114 performs the blank determination process to the entire document image in the third exemplary embodiment, the display control unit 114 may perform the blank determination process to the enlarged area centered at the enlargement operation portion, as in the first exemplary embodiment. In this case, the display control unit 114 determines whether the enlarged area centered at the enlargement operation portion is blank in Step S403 and Step S404. If the enlarged area is blank, the display control unit 114 extracts each image portion from the entire document image for which the enlargement operation has been performed and displays the corresponding notification image in the end portion of the enlarged display range 6 in Step S405 to Step S407. As in the second exemplary embodiment, the predetermined threshold value used in the blank determination process may be varied depending on the area to be subjected to the blank determination process.

Although the configuration in which the image processing apparatus 100 includes the touch panel is adopted in the first to third exemplary embodiments described above, the configuration is not limitedly used. For example, the user may perform the operation with a portable information terminal (a so-called smart phone or tablet terminal) including the touch panel. In such a case, the image processing apparatus 100 is connected to the portable information terminal via a network and the image data held by the image processing apparatus 100 is displayed on the touch panel of the portable information terminal. For example, the enlargement operation to the image data displayed on the touch panel of the portable information terminal by the user switches the display of the touch panel from the standard view to the enlarged view. For example, upon selection of an operation to print the image data on the touch panel, the content of the selected operation is transmitted from the portable information terminal to the image processing apparatus 100 where the printing is executed.

Although the user touches the touch panel to perform the operation in the first to third exemplary embodiments, for example, the image processing apparatus 100 may include an input unit, such as input buttons, and the user may perform the operation for the document image, such as the enlargement operation, with the input buttons.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
an image display configured to display a document image;
an extracting unit configured to extract image portions from the document image, in response to the display control apparatus receiving a pointing operation that points to position where a white portion of the document image, the white portion of the document image is a portion of the document image where a ratio of white pixels to non-white pixels in a specified area centered at the pointed position is greater than or equal to a threshold value; and
a display controller configured to control the image display to center and display an image portion among the extracted image portions that is nearest the pointed position.

2. The display control apparatus according to claim 1, wherein the display controller is configured to enhance the image portion that is nearest the pointed position.

3. The display control apparatus according to claim 1, wherein the display controller is configured to enlarge the image portion nearest the pointed position.

4. The display control apparatus according to claim 1, wherein the image display is configured to display a number of the image portions extracted by the extracting unit,
in response to the accepting unit receiving a pointing operation of pointing to a portion where the number of the image portions is displayed, the display controller switches from displaying one image portion at the center of the image display to displaying another image portion at the center of the image display.

5. The display control apparatus according to claim 1, wherein, in response to receiving the pointing operation, the display controller calculates a distance from an end of a display range to an image portion among the extracted image portions that is outside the display range and a size of the image portion at the indicated position, and displays the notification image to indicate the position of the image portion in the document image and the size of the image portion on the basis of the distance and the size that are calculated.

6. The display control apparatus according to claim 5, wherein the display range is adjustable with respect to the document image, and
wherein, in response to an input for adjusting the display range, the display controller moves the display range and calculates a distance from an end of the display range after the movement to the image portion outside the display range to display the notification image on the basis of the calculated distance.

7. An image forming apparatus comprising:
an image forming unit configured to form an image on a recording material on the basis of a document file;
an image display configured to display a document image representing the document file;
an accepting unit configured to accept a pointing operation that points to a portion in the document image displayed in the image display;
an extracting unit configured to, upon acceptance of the pointing operation, extract each image portion surrounded by non-white pixels from the document image in response to the pointed portion of the document image being a which portion which is a portion of the document image where a ratio of white pixels to non-white pixels in an area specified by the pointing operation being greater than or equal to a predetermined threshold value; and
a display controller configured to control the image display to center and display an image portion among the extracted image portions that is nearest the pointed portion.

8. A non-transitory computer readable medium storing a program causing a computer to execute a process comprising:
accepting pointing operation of pointing to a portion of a document image being displayed;
extracting each image portion surrounded by pixels other than white pixels from the document image, in response to the pointed portion of the document image being centered at a white portion of the document image is a portion of the document image having predetermined size and a ratio of white pixels to non-white pixels in a specified area centered at the pointed position that is greater than or equal to a predetermined threshold value; and
centering and displaying an image portion among the extracted image portions that is nearest the pointed portion.

9. A display control method comprising:
accepting pointing operation of pointing to a portion of a document image being displayed;
extracting each image portion surrounded by pixels other than white pixels from the document image, in response to the pointed portion of the document image being centered at a white portion of the document image which is a portion of the document image having predetermined size and a ratio of white pixels to non-white pixels in a specified area centered at the pointed position that is greater than or equal to a predetermined threshold value; and
centering and displaying an image portion among the extracted image portions that is nearest the pointed portion.

* * * * *